(12) United States Patent
Record

(10) Patent No.: US 7,278,534 B2
(45) Date of Patent: Oct. 9, 2007

(54) COMPACT-GRID CONVEYOR BELT

(75) Inventor: Shane Record, Manchester, NH (US)

(73) Assignee: Wire Belt Company of America, Londonderry, NH (US)

( * ) Notice: Subject to any disclaimer, the term of this patent is extended or adjusted under 35 U.S.C. 154(b) by 191 days.

(21) Appl. No.: 10/776,080

(22) Filed: Feb. 11, 2004

(65) Prior Publication Data

US 2005/0173230 A1    Aug. 11, 2005

(51) Int. Cl.
*B65G 15/54*    (2006.01)
(52) U.S. Cl. .................................... 198/848
(58) Field of Classification Search ............. 198/848, 198/849, 778
See application file for complete search history.

(56) References Cited

U.S. PATENT DOCUMENTS

| | | | |
|---|---|---|---|
| 741,851 A | 10/1903 | Swegle | |
| 2,025,620 A * | 12/1935 | Sneesby | 198/848 |
| 3,494,456 A | 2/1970 | Peterson | 198/195 |
| 3,794,155 A | 2/1974 | Bechtel, Jr. | 198/194 |
| 4,410,083 A | 10/1983 | Poerink | 198/853 |
| 4,703,566 A | 11/1987 | Kwoka | 34/78 |
| 4,754,871 A * | 7/1988 | Gustafson | 198/848 |
| 5,069,331 A | 12/1991 | Bartkowiak | 198/848 |
| 5,404,998 A | 4/1995 | Frye | 198/848 |
| 5,908,106 A | 6/1999 | Krueger | 198/848 |
| 5,950,807 A * | 9/1999 | Greer | 198/848 |

OTHER PUBLICATIONS

International Search Report for PCT/US0523679, Blaine Copenheaver, Dec. 29, 2005.

* cited by examiner

*Primary Examiner*—James R. Bidwell
(74) *Attorney, Agent, or Firm*—Bourque and Associates

(57) ABSTRACT

A wire belt includes a plurality of interconnected links that form a belt having a small mesh size, large percent open-area, and high strength, without the use of transverse rods or complex weaving patterns. Each of the links includes a hinge portion and hanger portion. The hinge portion includes a first and a second section. The first section is disposed at an angle relative to the hanger portion. The second section includes two loops sized and shaped to fit around at least a portion of the hanger portion of an adjacent link such that the two links are rotatably interconnected to form a continuous belt without the use of transverse rods or complex weaving patterns. The second section may have a "U" or "V" shape, and may include an elongated section such that the hinge portion extends beyond a transverse axis of the hanger portion.

43 Claims, 11 Drawing Sheets

COMPACT-GRID CONVEYOR BELT

TECHNICAL FIELD

The present invention relates to wire belts and more particularly, relates to wire belts capable of forming a belt having a small mesh size, large percent open-area, and high strength, without the use of transverse rods or complex weaving patterns.

BACKGROUND INFORMATION

Wire belts are commonly used for conveying articles during cooling, drying, coating, cooking and many other applications. In one particular application, wire belts are used to convey food articles during cooking or processing of the food. Wire belts are particularly advantageous for food processing because they can provide an open flow through mesh, a high degree of flexibility, a sanitary construction, simple installation and maintenance, or the ability to be positively driven. The wire belt typically includes a plurality of wire links interlocked or joined together to form an endless conveyor belt. A wire belt typically requires a splice connection between the wire links of opposite ends of a wire belt to form an endless conveyor belt.

Unfortunately, known wire belts having a large percent open area are difficult to form having mesh size in the range of approximately ⅛"×⅛" to 1"×1". This difficulty results, in part, from the difficulty in forming the necessary bends in the wire. In the past, wire belts having a mesh size between approximately ⅛"×⅛" to 1"×1" have been a close mesh or weave style wire belt. The known close mesh or weave style belts include a plurality of individual wires which are woven around each other or a cross rod to form a generally flat surface.

While these close mesh or weave style belts are capable of very small mesh sizes and have a relatively high strength, they have a very low percent open area making them undesirable for many applications, e.g., applications requiring heating, cooling, airflow, and draining. Moreover, these known belts utilize a considerable amount of wire per length of wire belt. This is undesirable in heating and cooling applications because a substantial amount of energy will be wasted in heating and/or cooling the belt itself rather than the objects being transported. Because of the complex weaving and the amount of material used, the known close weave or mesh belts are also expensive and time consuming to manufacture.

Another problem with the known close mesh or weave style belts is the difficulty in cleaning the belts. In the Food Processing Industry, it is critical to properly clean and sanitize the belt in order to produce wholesome food products free from physical and/or bacterial contamination that comply with USDA & FDA regulations. Because of the small percent open area and the numerous bends and overlaps formed by the wires, food and contaminants are difficult to remove making cleaning and sterilizing extremely difficult. As a result, belts of this design are often not suited for many food applications.

Some known wire belts having a large percent open area are typically formed by a plurality of zig-zag shaped wire strands that are woven directly into the adjacent, similarly shaped wire strand. However, these belts also suffer from several problems.

These known belts with a large percent open area are not capable of mesh sizes in the range of about ⅛"×⅛" to about 1"×1", and are thus not suitable for transporting small products such as berries, nuts and the like. Additionally, these belts also have a relatively low strength compared to the close mesh or weave style belts, and are thus not suitable for transporting heavy objects.

Accordingly, what is needed is a belt having a large percent open area that is capable of forming a mesh size in the range of about ⅛"×⅛" to about 1"×1". The belt should preferably have a relatively high strength making it suitable for transporting heavy objects. Additionally, the belt should be able to be easily cleaned and sanitized, and should minimize the amount of energy wasted in heating and cooling the belt. Lastly, the belt should be inexpensive and easy to manufacture.

SUMMARY

The present invention features a plurality of interconnected links that form a wire belt having a small mesh size, large percent open-area, and high strength, without the use of transverse rods or complex weaving patterns. The wire belt includes a hinge portion sized and shaped to rotatably interconnect with a portion of a hanger portion such that a first link will rotate or bend relative to an adjacent link. The hanger portion preferably includes a substantially horizontal section and preferably forms a "W" shape, though other shapes are also contemplated.

The hinge portion includes a first section disposed at an angle A1 relative to the hanger portion and a second section. The first section of the hinge portion preferably includes a first and a second transverse leg disposed at an angle A1 relative to the hanger portion. In the exemplary embodiment, the angle A1 is approximately 90 degrees, though it may also be greater than or less than 90 degrees.

The second section of the hinge portion is sized and shaped to fit around at least a portion of the hanger portion such that the belt does not require the use of a rod in order to bend. According to one embodiment, second section is disposed at an angle A2 relative to a longitudinal axis of the first section. In the preferred embodiment, the angle A2 is at least approximately 180 degrees. Alternatively, the second section is disposed a distance D from the first section wherein the distance D is smaller than the cross-sectional thickness of the hanger portion.

The second section may also include a first and a second loop each disposed at an angle greater than approximately 180 degrees relative to the longitudinal axis of the first section. The first and the second loops may be separated by a substantially horizontal section, a "V" shaped section, or a "U" shaped section.

Optionally, the wire belt may include a bent portion or angle A3 disposed between the hanger portion and the hinge portion, proximate the substantially horizontal section and the first and second transverse leg. The bent portion/angle A3 is disposed at an angle with respect to the longitudinal axis L of the wire belt and allows the wire belt to have a substantially flat or smooth carrying or outer surface. In the preferred embodiment, the bent portion/angle A3 is sized and shaped such that the substantially horizontal section of the hanger portion is approximately one wire diameter D from the first and second transverse legs of the hinge portion.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
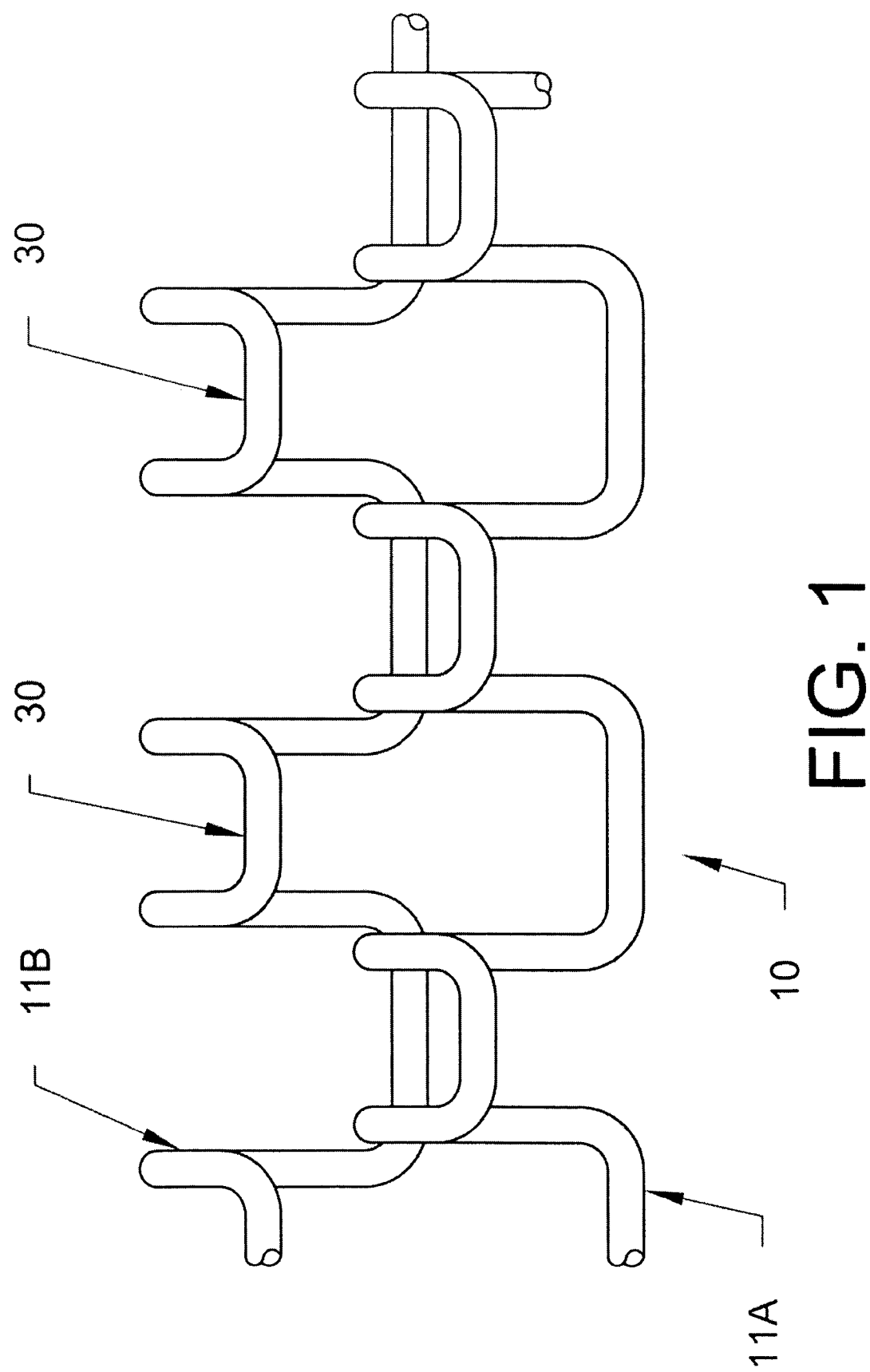
FIG. 1 is plan view of one embodiment of a plurality of links according to the present invention.
Figure 2:
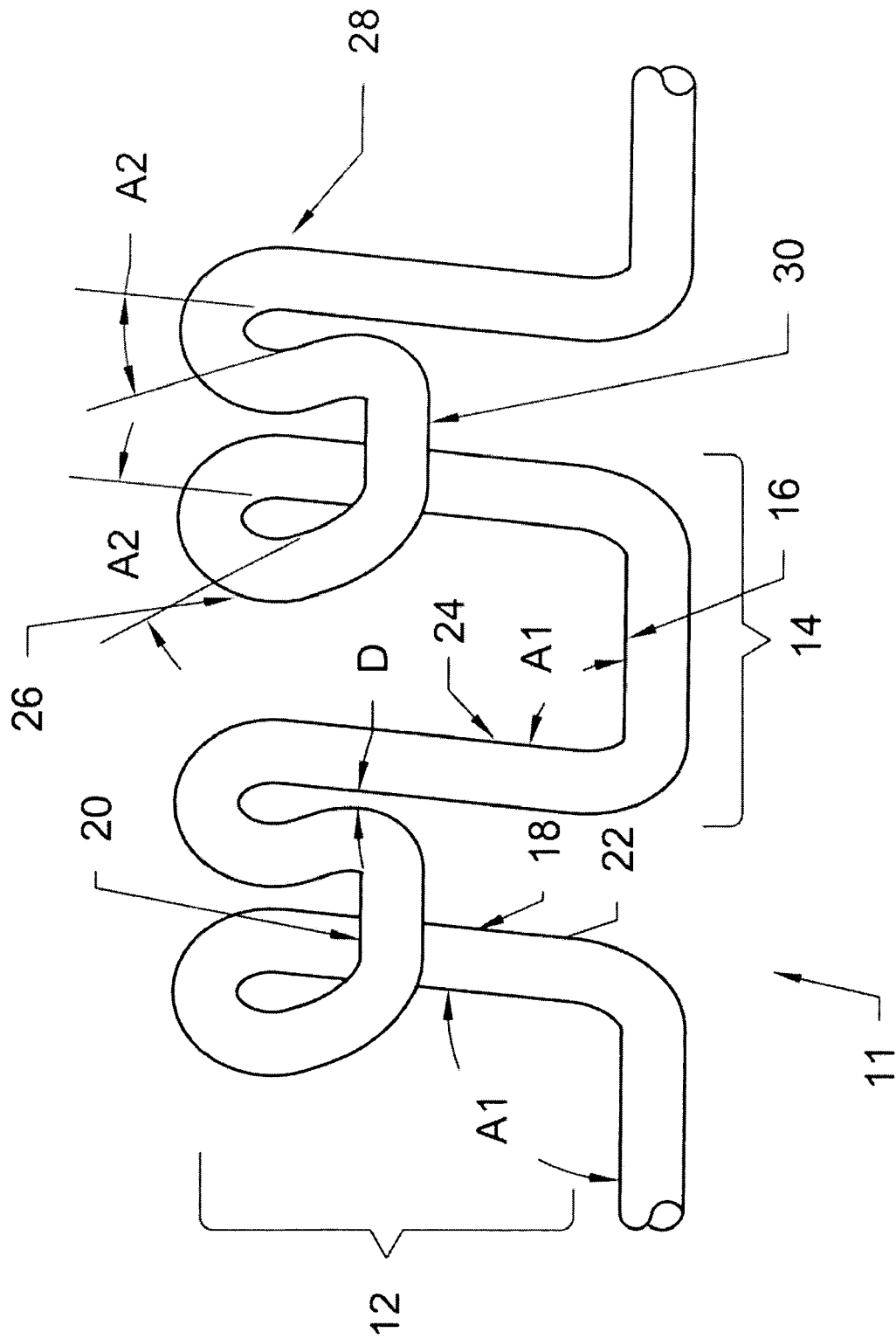
FIG. 2 is a plan view of one link shown in FIG. 1 according to the present invention.

A wire belt 10, FIGS. 1 and 2, according to the present invention, includes a plurality of interconnected links 11 that form a belt having a small mesh size, large percent open-area, and high strength, without the use of transverse rods or complex weaving patterns. Because the wire belt 10 does not utilize transverse rods or complex, intricate weaving patterns, the wire belt 10 is easily cleanable and sterilizeable and also minimizes the amount of energy wasted in heating/cooling the belt itself, and is therefore particularly suited for use in the Food Industry (or any other application which requires sterilizeabilty) as well as heating/cooling applications. Additionally, the wire belt 10 is capable of forming very small mesh sizes, for example mesh sizes in the range of about ⅛"×⅛" to about 1"×1" (preferably about 0.25"× 0.25" to about 0.5"×0.5"), and is thus particularly useful for transporting small objects, such as berries and the like. The wire belt 10 is also capable of forming belts having a large percent-open area, for example between about 60% to about 85%, and is particularly useful for applications that require flow-through or drainage.

Each of the links 11 includes a hinge portion 12 and hanger portion 14. The hinge portion 12 of a first link 11A is sized and shaped to rotatably interconnect with the hanger portion 14 of an adjacent link 11B such that the links 11 form a continuous belt 10 without the use of transverse rods or complex weaving patterns.

Figure 3:
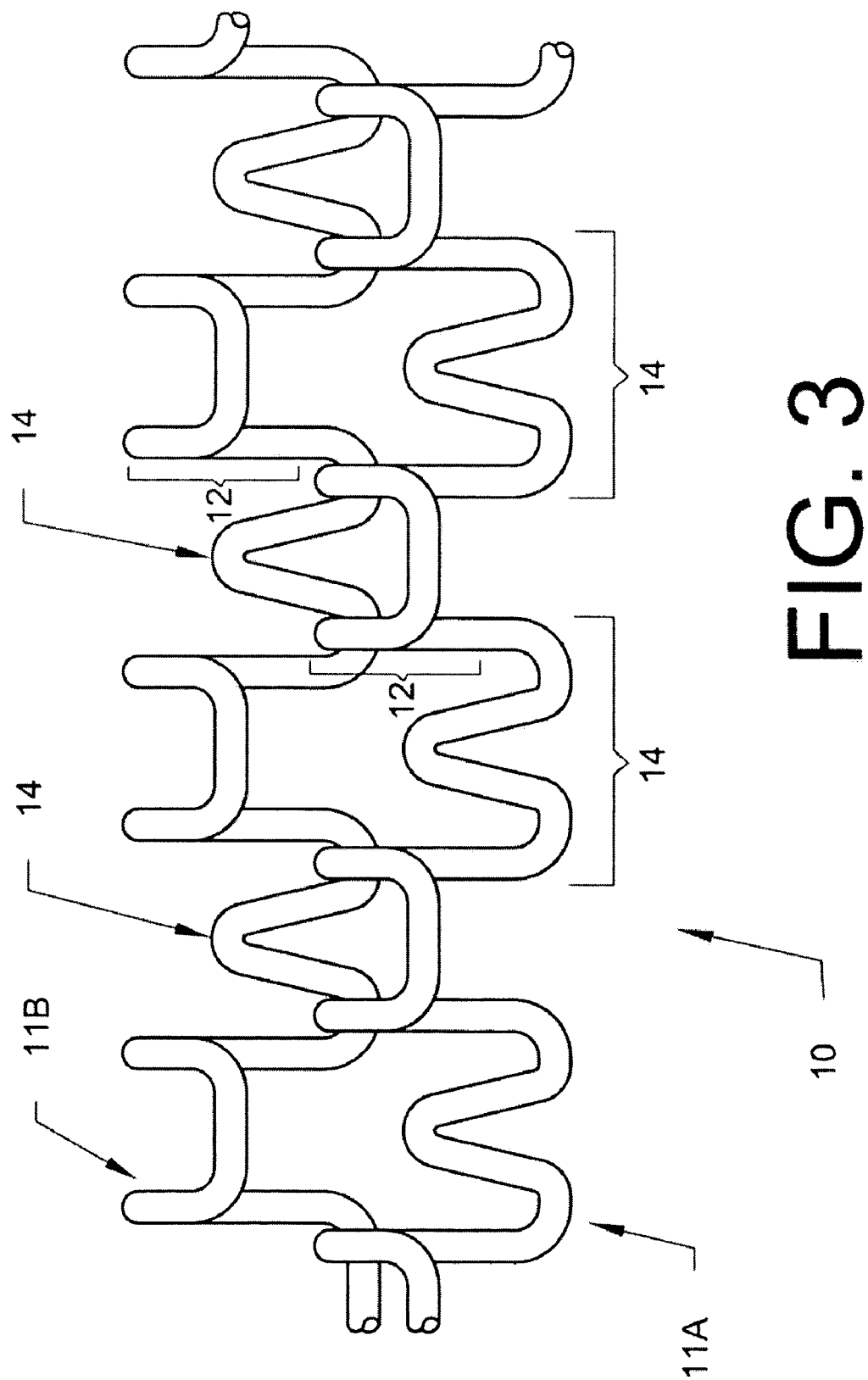
FIG. 3 is plan view of one embodiment of a plurality of links having a "U" or "V" shape according to the present invention.
Figure 4:
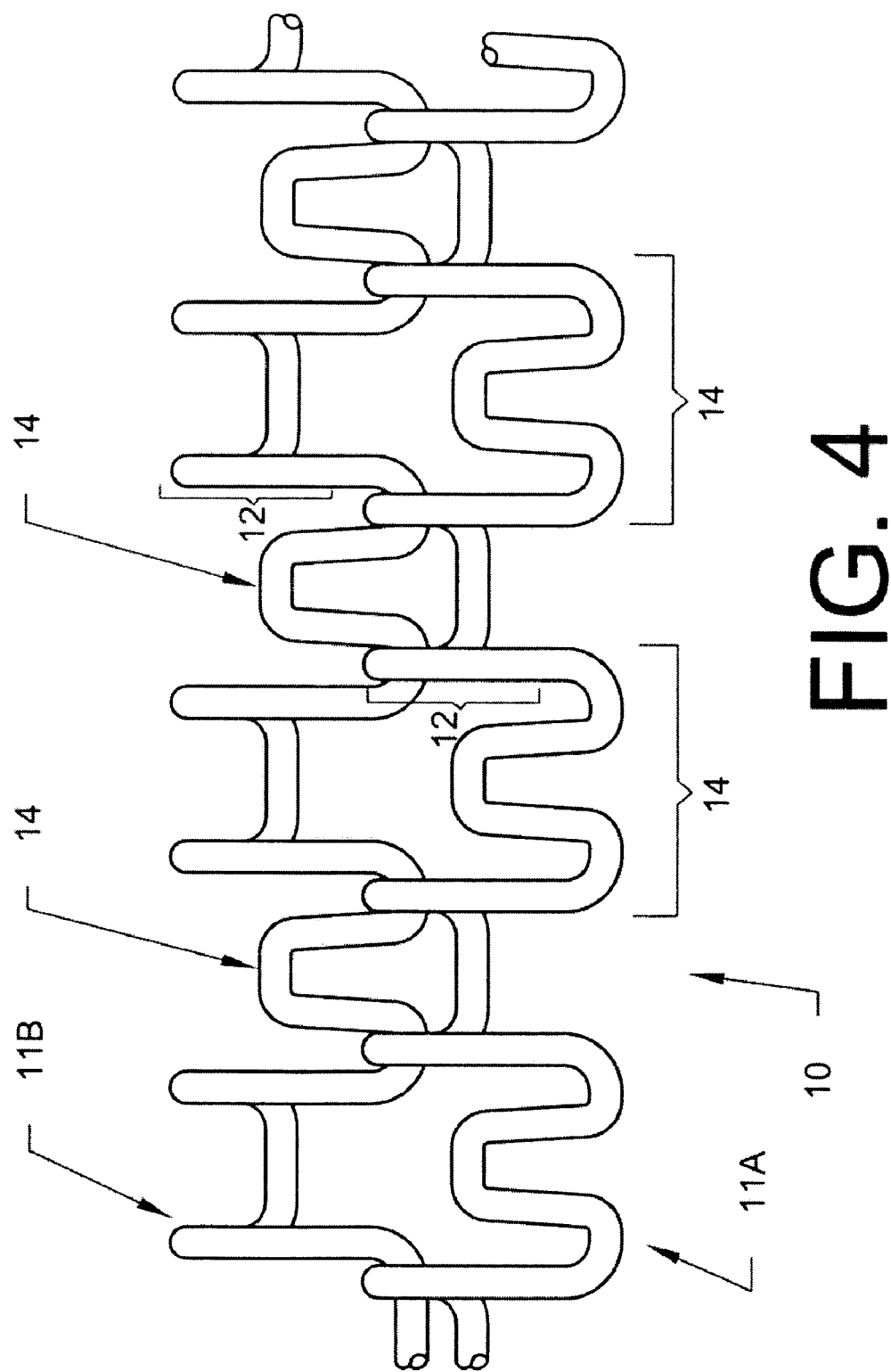
FIG. 4 is plan view of one embodiment of a plurality of links having a trapezoidal shape according to the present invention.

The hanger portion 14 preferably includes a substantially horizontal section 16 (as shown in FIGS. 1 and 2), though the hanger portion 14 may also include other shapes such as "U" or "V" shapes as shown in FIG. 3. Alternatively, the hanger portion 14 may have a trapezoidal shape as shown in FIG. 4. The length of the hanger portion 14 is preferably at least as large as the length of the hinge portion 12.

The hinge portion 12, FIG. 2, preferably includes a first section 18 and a second section 20. The first section 18 preferably includes a first and a second transverse leg 22, 24 disposed at an angle A1 relative to the hanger portion 14. In the preferred embodiment, the angle A1 is preferably about 90 degrees, though angles greater than or less than 90 degrees are also possible. According to another embodiment, the hinge portion 12, FIG. 5, may form an "M" or "W" shape.

The second section 20, FIG. 2, of the hinge portion 12 preferably includes a first and a second loop 26, 28 forming an eyelet or loop that is sized and shaped to fit around at least a portion of the substantially horizontal section 16 of the hanger portion 14. The first and the second loop 26, 28 are disposed at an angle A2 relative to the first section 18. The angle A2 is preferably greater than approximately 180 degrees, preferably about 225 to about 270 degrees. Alternatively, the first and the second loop 26, 28 are sized and shaped such that the distance D between the first and second loops 26, 28 and the first and second transverse legs 22, 24 is less than the cross-sectional thickness of the substantially horizontal section 16 of the hanger portion 14.

Figure 6:
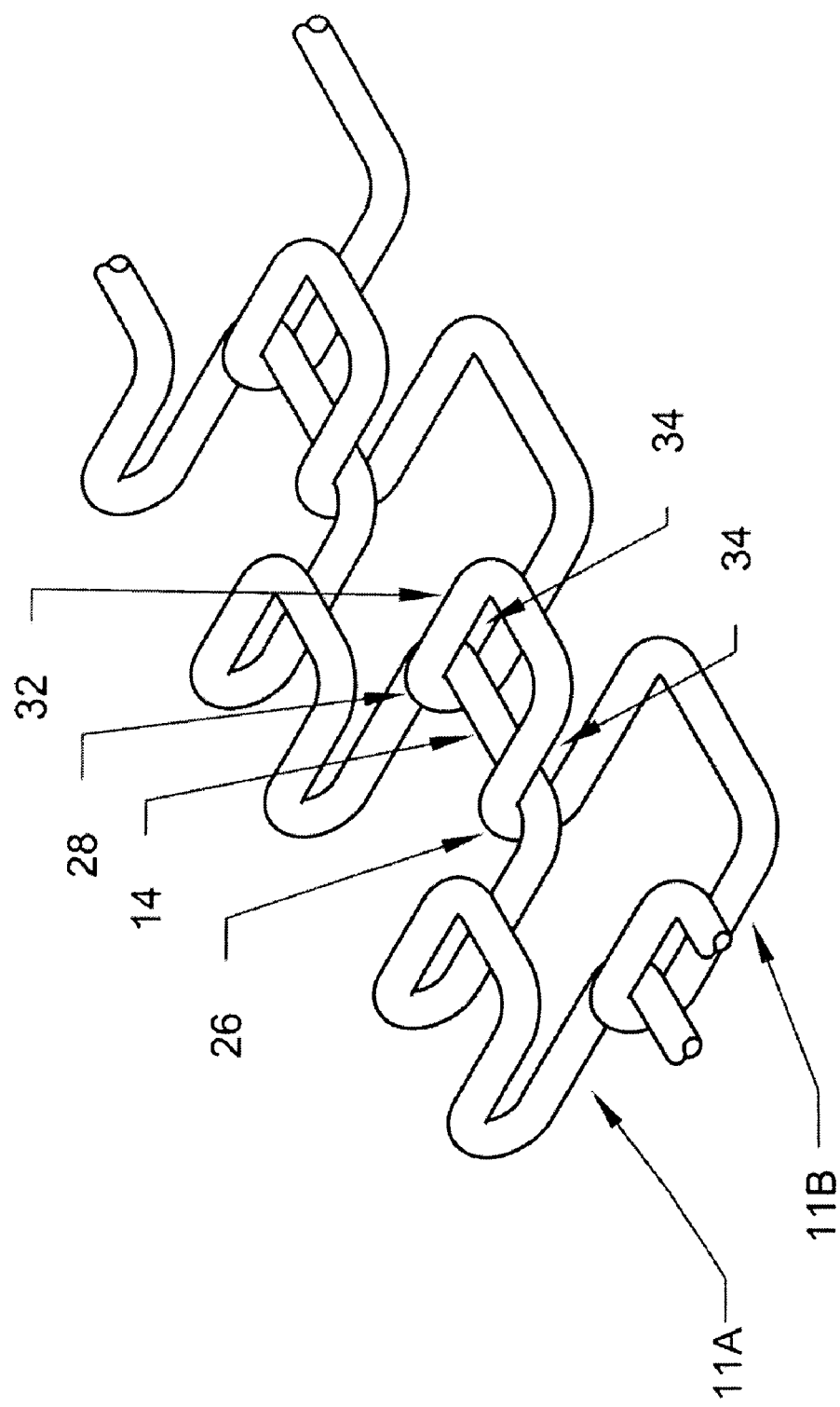
FIG. 6 is plan view of one embodiment of a plurality of links having an elongated hinge according to the present invention.
Figure 7:
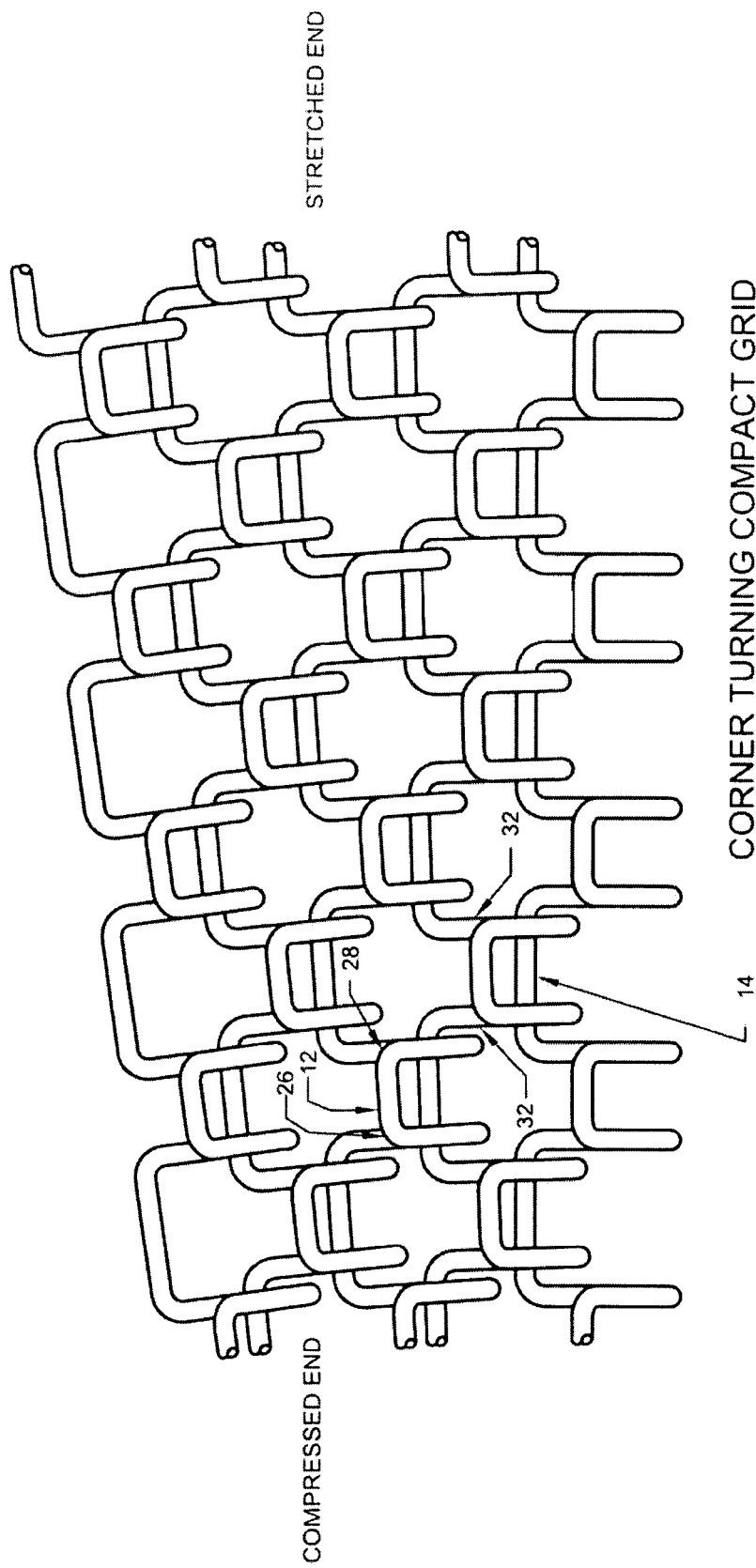
FIG. 7 is plan view of one embodiment of a plurality of links having an elongated hinge shown bending around a corner according to the present invention.
Figure 8:
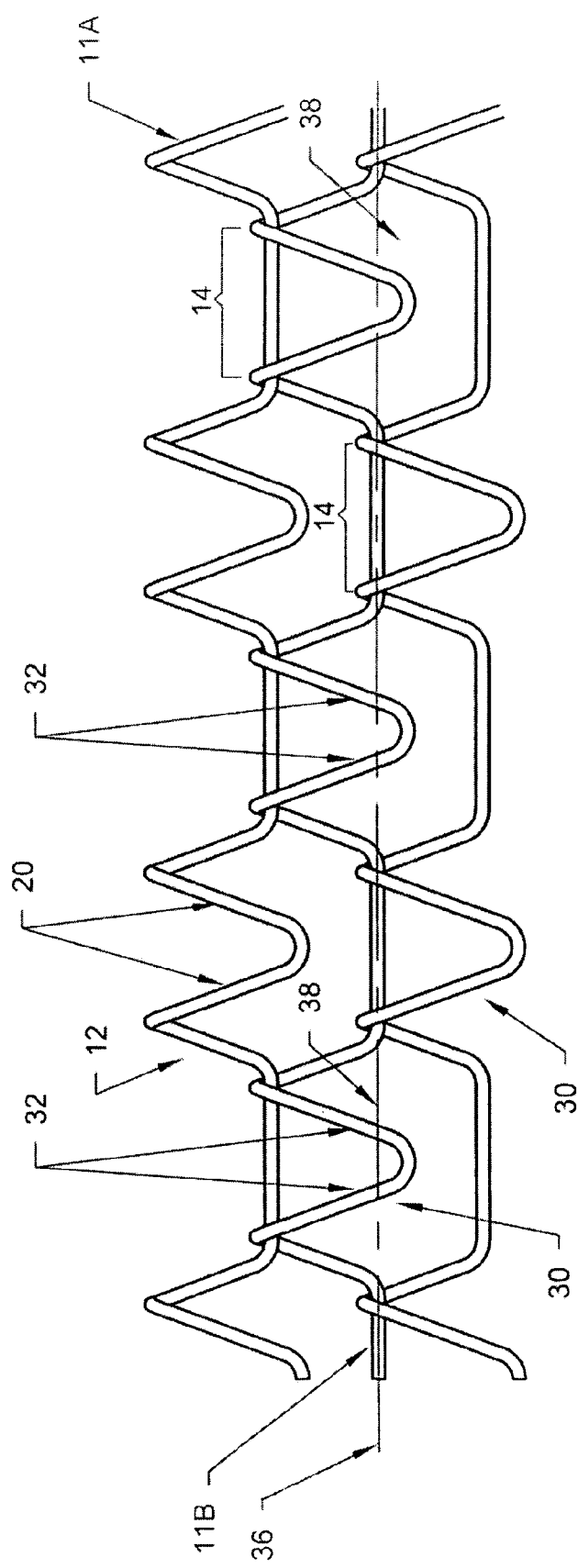
FIG. 8 is plan view of another embodiment of a plurality of links having an elongated hinge as shown in FIG. 6 or 7 wherein the hinge extends beyond a transverse axis of the hanger portion according to the present invention.

The first and second loops 26, 28, FIGS. 6–8, may also include an extended portion 32 such that the loops 26, 28 form a cavity 34 in which the hanger portion 14 of an adjacent link 11B may move. This embodiment is particularly useful for applications where the wire belt 10 will need to bend transversely or compress as shown in FIG. 7. Additionally, the extended portion 32, FIG. 8, may extend beyond the longitudinal axis 36 of the hanger portion 14 such that the second section 20 reduces the space 38 between a first link 11A and an adjacent link 11B.

Figure 5:
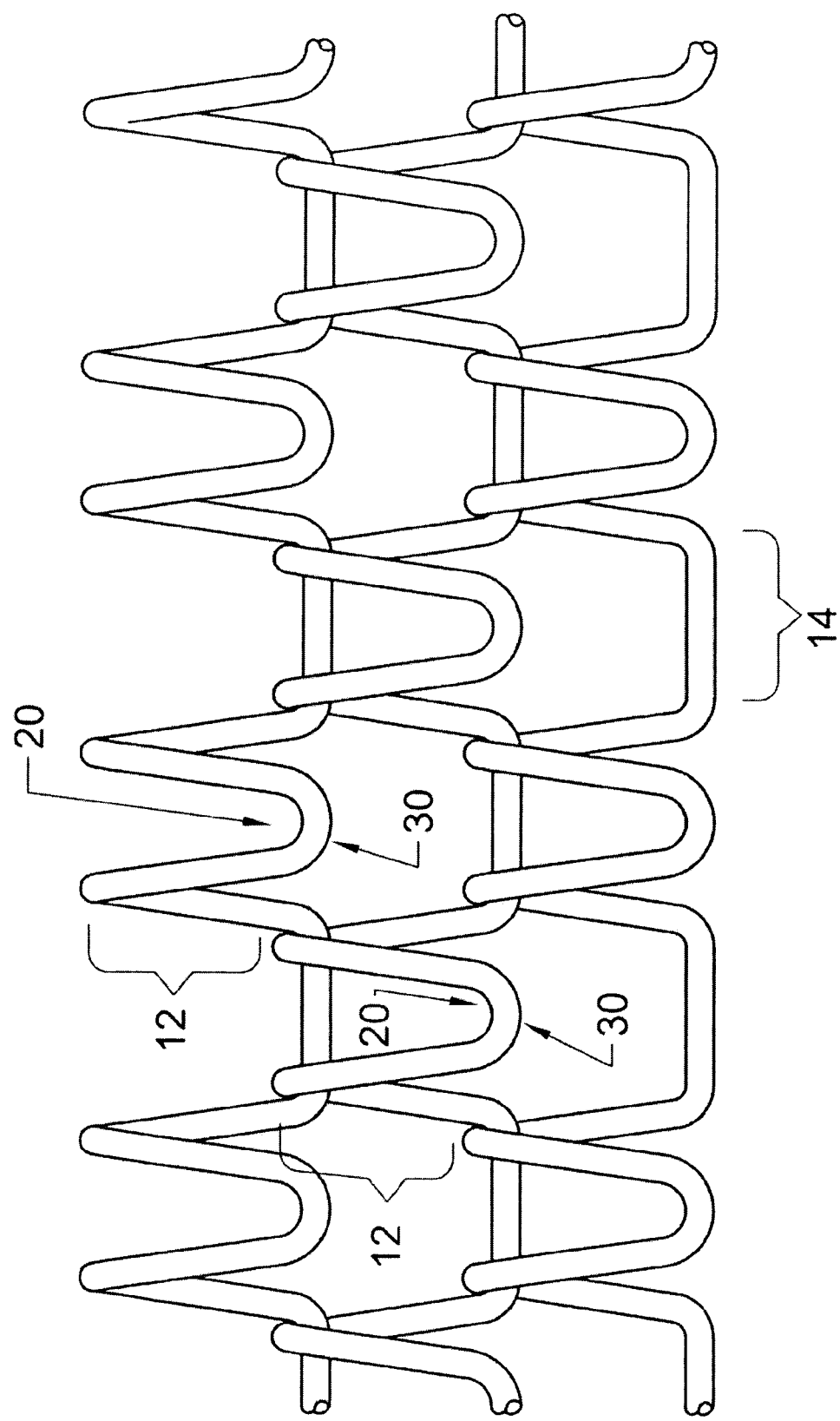
FIG. 5 is plan view of one embodiment of a plurality of links having a "M" or "W" shape according to the present invention.

The first and second loops 26, 28 are preferably spaced apart from one another by a horizontal section (as shown in FIGS. 1–4), but may also include a "U" or "V" shaped section as shown in FIGS. 5 and 8. Other shapes such as trapezoids, rectangles, and the like are also envisioned.

According to one embodiment, the wire belt 10 is produced by first making a plurality of links 11 each having a plurality of hinge and hanger portions 12, 14. Once the links 11 are made, the links 11 are aligned such that the hinge portion 12 of a first link 11A is adjacent to a hanger portion 14 of an adjacent link 11B. According to one embodiment, wire material is resilient enough such that hinge portion 12 may be forced over the hanger portion 14 wherein the hinge portion 12 bends over the hanger portion 14 and back into its original position. Alternatively, the angle A2 may be formed initially such that it is small enough to allow the hinge portion 14 to be inserted within the loops 26, 28. Once the hinge portion 14 is inserted within the loops 26, 28, the hinge portion 12 is crimped around the hanger portion 14 such that the angle A2 is increased and the links 11 are interconnected.

Figure 9:
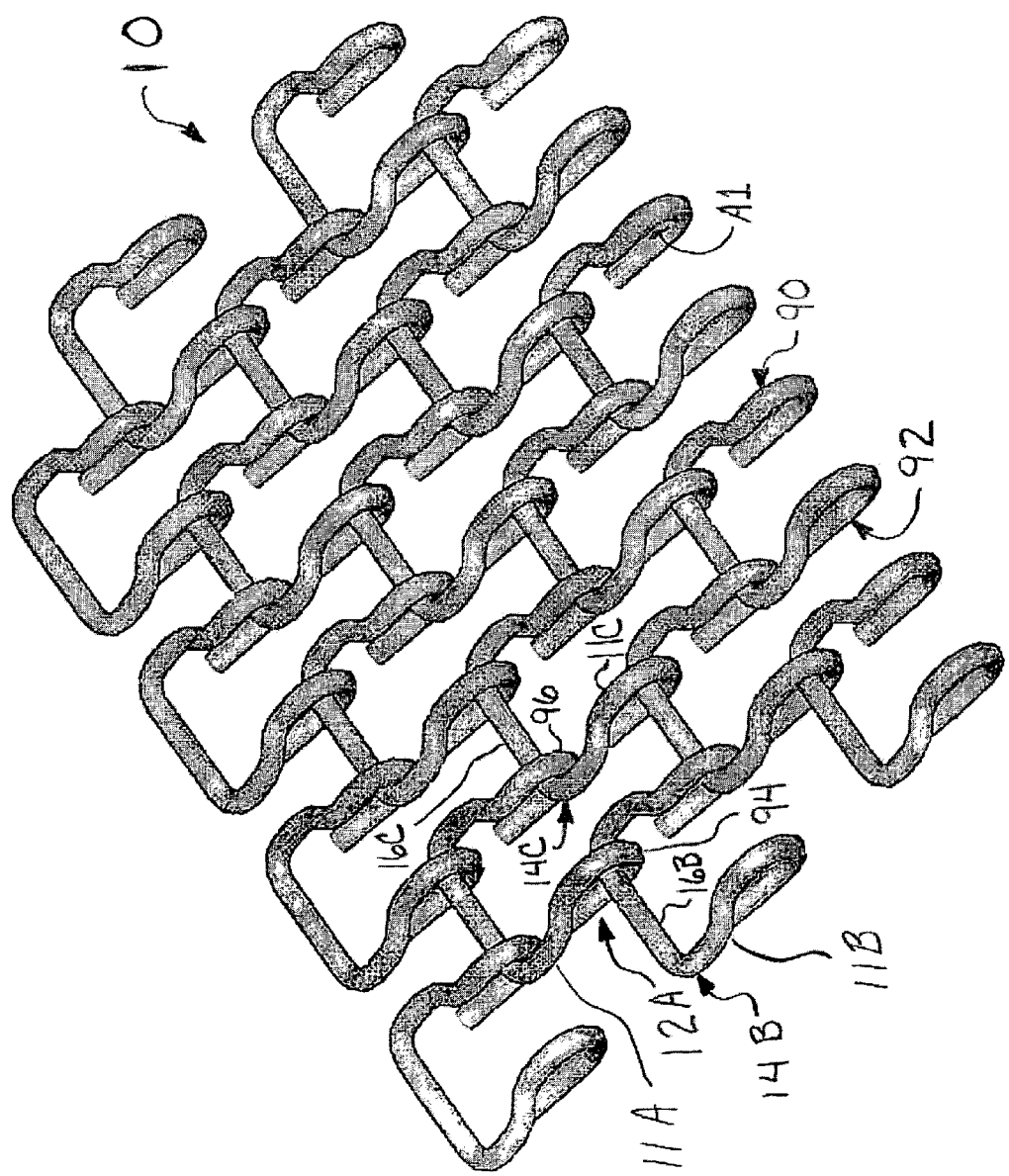
FIG. 9 is a plan view of a single strand belt forming a multiple link width belt according to the present invention.

According to yet another embodiment, the wire belt 10, FIG. 9, includes a multi-strand belt wherein each link 11 includes a hinged portion 12 and a hanger portion 14 as will be discussed in greater detail hereinbelow. The hanger portion 14 preferably includes a substantially horizontal section 16 as described in the previous embodiments, though the hanger portion 14 may also include any other shape such as "U" shapes, "V" shapes, or trapezoidal shapes as described in the previous embodiments.

The hinge portion 12 preferably includes a first and a second section 90, 92 extending at an angle A1 relative to the hanger portion 14. The first and the second sections 90, 92 each include a loop 94, 96 forming an eyelet or loop that is sized and shaped to fit around at least a portion of the substantially horizontal section 16 of the hanger portion 14 as described hereinabove. The loops 94, 96 are substantially the same as described above; however, the hinged portion 12 does not include the second section 20 as disclosed in the previous embodiments.

A plurality of links 11A 11B, 11C are arranged to form a single strand belt having a multiple link width 10. According to this embodiment, the loops 94, 96 of a first link 11A are disposed about the horizontal portions 16B, 16C of an adjacent second and third link 11B, 11C.

Figure 10:
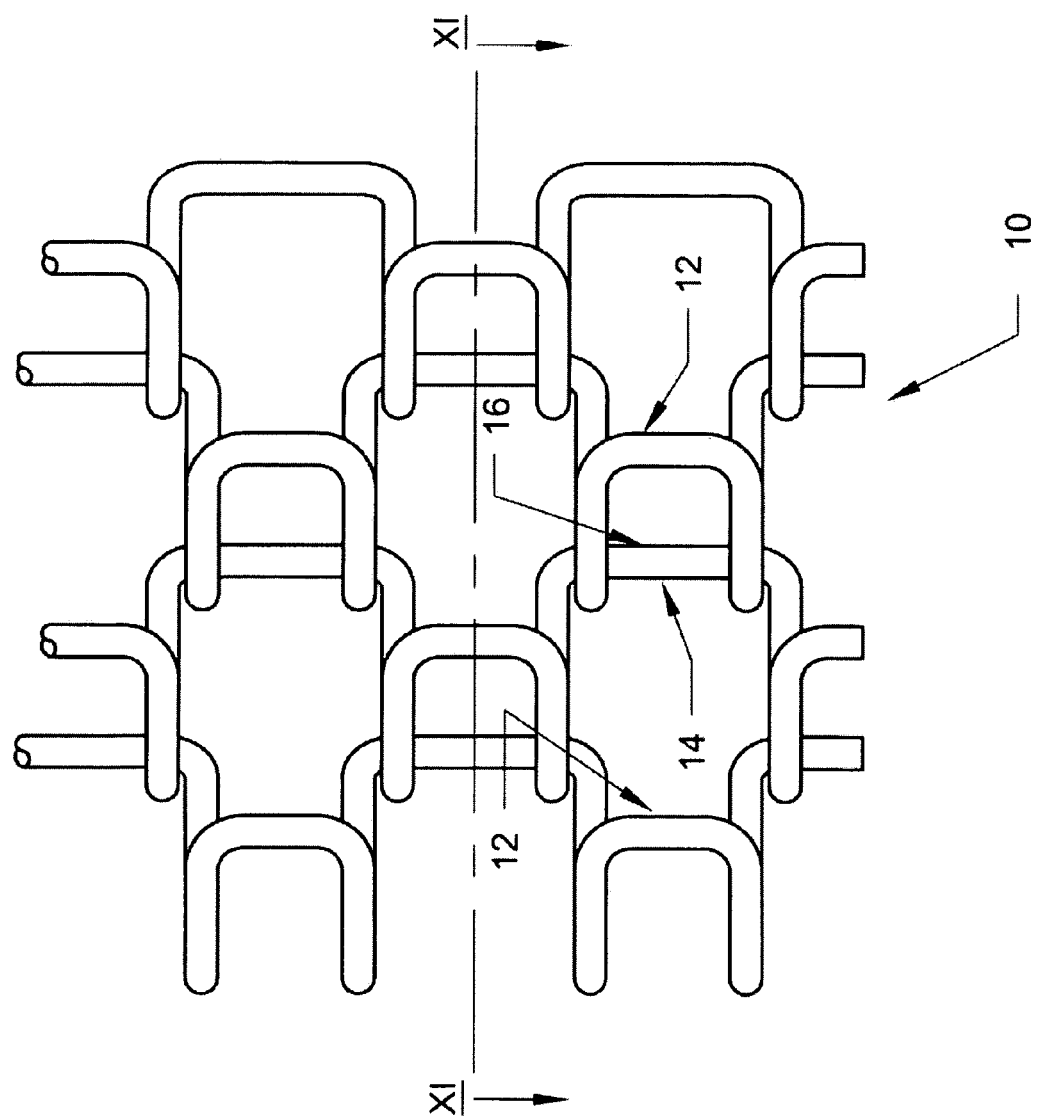
FIG. 10 is a plan view of the wire belt according to the present invention having a substantially flat or smooth carrying surface.
Figure 11:
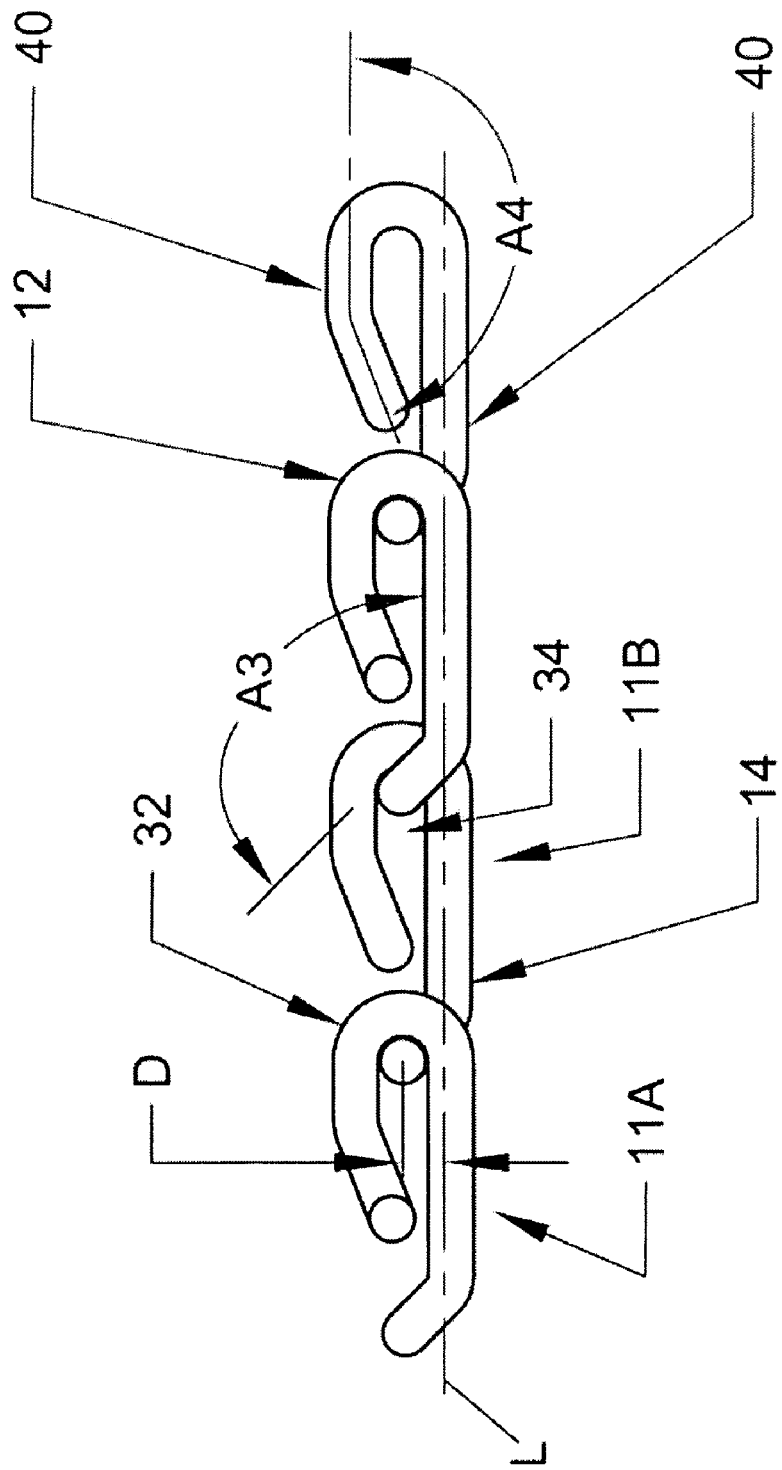
FIG. 11 is a plan view of the wire belt shown in FIG. 10 taken along the line XI—XI.

The wire belt 10, FIGS. 10 and 11, optionally includes bent portion or angle A3 (best shown in FIG. 11) between the hinge portion 12 and the hanger portion 14, proximate the substantially horizontal section 16 and the first and second transverse leg 22, 24. The bent portion/angle A3 is disposed at an angle with respect to the longitudinal axis L of the wire belt 10 and allows the wire belt 10 to have a substantially flat or smooth carrying or outer surface 40. In the preferred embodiment, the bent portion/angle A3 is sized and shaped such that the substantially horizontal section 16 of the hanger portion 14 is approximately one wire diameter D from the first and the second transverse leg 22, 24 of the hinge portion 12. Bent portion/angle A3 may be used with any of the various embodiments of the wire belt 10 described hereinabove. Optionally, the wire belt 10 may include an extended portion 32, as discussed above, such that the hinge portion 12 forms a cavity 34. The extended portion 32 may optionally include yet another bend A4 that extends towards the hanger portion 14. Bend A4 effectively closes the cavity 34 and prevents the adjacent link 11B from becoming disconnected from the first link 11A making this embodiment particularly useful for applications where the wire belt 10 will be both pushed and pulled.

Modifications and substitutions by one of ordinary skill in the art are considered to be within the scope of the present invention, which is not to be limited except by the following claims.

The invention claimed is:

1. A belt comprising:
a first and at least a second wire link wherein each of said wire links is adapted to interconnect with at least one longitudinally adjacent wire link including:
a first and at least a second hanger portion having each a horizontal length and a cross-sectional thickness; said first and said
at least a second hanger portion disposed a spaced distance apart from each other along a traverse axis of said belt; and
at least one hinge portion disposed between said first and said at least a second hanger portions, said at least one hinge portion having a first section including a first and a second transverse leg each disposed at an angle A1 of approximately 90 degrees relative to said hange portion, and a second section disposed at an angle at least approximately 180 degrees relative to a longitudinal axis of said first section, wherein said second section of said at least one hinge portion is sized and shaped to fit around at least a portion of said first hanger portion of said at least one longitudinally adjacent wire link.

2. The belt as claimed in claim 1 wherein at least one hanger portion includes a substantially horizontal section.

3. The belt as claimed in claim 1 wherein at least one hanger portion includes a substantially "U" shape.

4. The belt as claimed in claim 1 wherein at least one hanger portion includes a substantially "V" shape.

5. The belt as claimed in claim 1 wherein at least one hanger portion includes a substantially trapezoidal shape.

6. The belt as claimed in claim 1 wherein at least a portion of said second section of said first hinge portion is disposed a distance D from said first section wherein said distance D from said first section of said first portion wherein said distance D is less than said cross-sectional thickness of said hanger portion of said at least one longitudinally adjacent wire link.

7. The belt as claimed in claim 1 wherein said second sections of said hinge portions extend beyond a transverse axis of said hanger portions.

8. The belt as claimed in claim 1 wherein each of said second sections include a first and a second loop each disposed at an angle greater than approximately 180 degrees relative to said longitudinal axis of said first section.

9. The belt as claimed in claim 8 wherein said first and said second loops are separated by a "V" shaped section.

10. The belt as claimed in claim 8 wherein said first and said second loops are separated by a "U" shaped section.

11. The belt as claimed in claim 1 wherein said hinge sections include a "W" shape.

12. The belt as claimed in claim 1 wherein said belt further includes an angle A3 with respect to said longitudinal axis of said belt disposed between said hanger portions and said hinge portions such that said belt includes a substantially flat carrying surface.

13. The belt as claimed in claim 1 wherein said belt further includes a plurality of links each having a bent portion disposed between said hanger portions and said hinge portions such that said hanger and said hinge portions of a first link are disposed in substantially the same plane as said hanger and said hinge portions of said longitudinally adjacent link, respectively.

14. The belt as claimed in claim 13 wherein said bent portion is sized and shaped such that said hanger portion is disposed in a plane which is approximately one wire diameter from a plane that said hinge portion is disposed.

15. A belt having a longitudinal and traverse axis, said belt comprising:
a hanger portion having a horizontal length and a cross sectional thickness; and
a first and at least a second hinge portion disposed along said transverse axis of said belt and separated by at least one hanger portion, each of said hinge portions having a first section including a first and a second transverse leg each disposed at an angle Al of approximately 90 degrees relative to a longitudinal axis of said hanger portion and a second section having at least a portion disposed at an angle A2 relative to said first section and a distance D from said first section, wherein said second section is sized and shaped to fit around at least a portion of said hanger portion, and wherein said angle A2 is large enough such that said distance D is smaller than said cross-sectional thickness of said hanger portion.

16. The belt as claimed in claim 15 wherein said hanger portion includes a substantially horizontal section.

17. The belt as claimed in claim 15 wherein said hanger portion includes a substantially "U" shape.

18. The belt as claimed in claim 15 wherein said hanger portion includes a substantially "V" shape.

19. The belt as claimed in claim 15 wherein said hanger portion includes a substantially trapezoidal shape.

20. The belt as claimed in claim 15 wherein said second sections of said hinge portions extend beyond a transverse axis of said hanger portion.

21. The belt as claimed in claim 15 wherein each of said hinge portions include said second section having a first and a second loop each disposed at an angle greater than approximately 180 degrees relative to said longitudinal axis of said first section.

22. The belt as claimed in claim 21 wherein said first and said second loop are separated by a "V" shaped section.

23. The belt as claimed in claim 21 wherein said first and said second loop are separated by a "U" shaped section.

24. The belt as claimed in claim 15 wherein said hinge section includes a "W" shape.

25. The belt as claimed in claim 15 wherein said belt further includes an angle A3 with respect to said longitudinal axis of said belt disposed between said hanger portions and said hinge portions such that said belt includes a substantially flat carrying surface.

26. The belt as claimed in claim 15 wherein said belt further includes a bent portion disposed between said hanger portions and said hinge portions such that said hanger and said hinge portions are all substantially the same plane.

27. The belt as claimed in claim 26 wherein said bent portion is sized and shaped such that said hanger portions are disposed in a plane which is approximately one wire diameter from a plane that said hinge portions are disposed.

28. A wire belt comprising:
a first and at least a second link, each including:
a first and at least a second hanger portion disposed a spaced distance from each other along a transverse axis of said links; and
a first and at least a second hinge portion disposed a spaced apart distance from each other along said transverse axis wherein at least said first hinge portion is disposed between said first and said at least a second section hanger portions, each hinge portion having a first section disposed at an angle A1 of approximately 90 degrees relative to a longitudinal axis of said hanger portion and a second section having at least a portion disposed at an angle A2 relative to said first section and a distance D from said first section wherein at least one of said second sections of said hinge portions of said first link is sized and shaped to fit around at least a portion of said hanger portion of at least one of said hanger portions of said second link such that said first and said at least one second links are rotatably disposed with respect to each other without the use of a rod.

29. The wire belt as claimed in claim 28 wherein said angle A2 is large enough such that said distance D is smaller than said cross-sectional thickness of said hanger portion of said second link.

30. The wire belt as claimed in claim 28 wherein said hanger portions includes substantially horizontal section.

31. the belt as claimed in claim 28 wherein said hanger portions include a substantially "U" shape.

32. The belt as claimed in claim 28 wherein said hanger portions include a substantially "V" shape.

33. The belt as claimed in claim 28 wherein said hanger portions include a substantially trapezoidal shape.

34. The wire belt as claimed in claim 28 wherein said first sections in said a first link include and a second transverse leg disposed at said angle A1 relative to said hanger portion.

35. The wire belt as claimed in claim 28 wherein said second sections of said hinge portions in said first link extend beyond a transverse axis of said hanger portion in said first link.

36. The wire belt as claimed in claim 28 wherein said second section further includes a first and a second loop each disposed at an angle greater than approximately 180 degrees relative to said longitudinal axis of said first section.

37. The wire belt as claimed in claim 36 wherein said first and said second loop are separated by a "V" shaped section.

38. The wire belt as claimed in claim 36 wherein said first and said second loop are separated by a "U" shaped section.

39. The wire belt as claimed in claim 28 wherein said hinge section includes a "W" shape.

40. The wire belt as claimed in claim 28 wherein the distance between said first and said second transverse leg is between about 1/8 to about 0.75 inches and wherein said length of said first and said second transverse leg is between about 1/8 to about 0.75 inches.

41. The wire belt as claimed in claim 28 wherein said wire belt further includes an angle A3 with respect to a longitudinal axis of said belt disposed between said hanger portion and said hinge portion such that said wire belt includes a substantially flat carrying surface.

42. The wire belt as claimed in claim 28 wherein said wire belt further a plurality of links each having a bent portion disposed between said hanger portion and said hinge portion such that a hanger and a hinge portion of a first link is disposed in substantially the same plane as a hanger and a hinge portion of an adjacent link, respectively.

43. The wire belt as claimed in claim 42 wherein said bent portion is sized and shaped such that said hanger portion is disposed in a plane which is approximately one wire diameter from a plane that said hinge portion is disposed.

* * * * *